(12) United States Patent
Marsden et al.

(10) Patent No.: US 6,225,974 B1
(45) Date of Patent: May 1, 2001

(54) GAMUT CORRECTION WITH COLOR SEPARATION AND METHODS AND APPARATUSES FOR PERFORMING SAME

(75) Inventors: Jonathan Marsden, Sunnyvale; Ramin Samadani, Menlo Park, both of CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 08/878,811

(22) Filed: Jun. 19, 1997

(51) Int. Cl.[7] .................................................. G06T 11/40
(52) U.S. Cl. ........................ 345/150; 345/153; 345/154
(58) Field of Search .................................... 345/154, 150, 345/153; 382/167

(56) References Cited

U.S. PATENT DOCUMENTS

| | | | |
|---|---|---|---|
| 4,721,951 | * 1/1988 | Holler | 340/701 |
| 4,829,455 | * 5/1989 | Long et al. | 364/521 |
| 5,233,684 | * 8/1993 | Ulichney | 395/131 |
| 5,416,614 | * 5/1995 | Crawford | 358/530 |
| 5,479,189 | * 12/1995 | Chesavage | 345/154 |
| 5,510,852 | * 4/1996 | Shyu | 348/660 |
| 5,539,540 | 7/1996 | Spaulding et al. | 358/518 |
| 5,650,942 | * 7/1997 | Granger | 364/526 |
| 5,821,919 | * 10/1998 | Coelho | 345/154 |
| 5,854,633 | * 12/1998 | Cooper et al. | 345/431 |

FOREIGN PATENT DOCUMENTS

| | | | | |
|---|---|---|---|---|
| 0611231A1 | 8/1994 | (EP) | ................................ | H04N/1/46 |
| 0679020A1 | 10/1995 | (EP) | ................................ | H04N/1/60 |

\* cited by examiner

*Primary Examiner*—William A. Cuchlinski, Jr.
*Assistant Examiner*—Marthe Y. Marc-Coleman
(74) *Attorney, Agent, or Firm*—Michael A. Glenn (57) ABSTRACT

Methods and apparatuses for correcting gamut limitations of a color device. A method includes creating a predefined color space for use in gamut correction due to the gamut limitations of the color device, such as a color printer, and producing a set of color data values using the predefined color space. The set of color data values is for use in converting from a first color space (e.g., RGB) to a second color space (e.g., CMYK). A method in another embodiment includes creating a first color separation table, creating a predefined color space, creating a second color separation table for converting values of colors in the predefined color space to values in a colorant space, and creating a composite color separation lookup table by using a plurality of first values from the first color separation table and using a plurality of second values from the second color separation table. The predefined color space is typically based upon a set of redefined chromaticities which are used in a transformation function. Various apparatuses of invention, including data structures in computer readable media (e.g., LUTs) and hardware and/or software combinations, are described. Methods of using these apparatuses are also described.

29 Claims, 7 Drawing Sheets

Slice of constant Lab hue and gamut mapping example.

*FIG. 1*

Color conversion process.

*FIG. 2*

The process used for building a separation table.

*FIG. 3*

Chromaticity diagram with monitor chromaticities (1) and redefined chromaticities (2).

Combining separation tables.

FIG. 10

GAMUT CORRECTION WITH COLOR SEPARATION AND METHODS AND APPARATUSES FOR PERFORMING SAME

BACKGROUND OF THE INVENTION

The present invention pertains to methods and apparatuses for correcting for gamut limitations of a color device. More particularly, the present invention relates to methods and apparatuses for creating and using data structures which determine the amounts of colorants that a color output device, such as a color printer, prints or uses in response to requests to print specific colors.

Prior to describing the invention, the following definitions are provided.

Tristimulus Values—Three numbers that describe the visual response to an original color. Two colors with the same tristimulus values look the same if they are viewed under similar conditions. The common coordinates used for tristimulus values are CIEXYZ.

Luminance—That aspect of a colored stimulus relating to its intensity.

Hue—That aspect of a colored stimulus relating to its color name.

Saturation—That aspect of a colored stimulus relating to its purity, or absence of contamination with white.

Gamut—The range of colors producible with a set of inks, lights, or other colorants. The gamut can conveniently be described in terms of a particular volume of a color space.

Chromaticity coordinates—The chromaticity coordinates of a color result from a mapping of its tristimulus values to two coordinates that describe the color without regard to its luminance. In other words, two colors that correspond in chromaticities differ only in luminance.

The increased availability of color monitors in combination with color printers has allowed computer users to view a full color image on a color monitor and then to request a full color printout of that image on a color printer. Users would like the print to look like the display. Unfortunately, the range of colors available from a printer is typically much smaller than the range of colors available from a monitor. In this instance, the color gamut of the monitor is larger than the color gamut of the printer.

Monitors are typically driven by three digital signals, device-dependent RGB, that determine the intensities of light emission of red, green and blue phosphors, respectively. In practice, the RGB signals are commonly quantized to 8 bits for each signal and represent a set of integer values from [0,255]. In this description, we normalize the set of values for a particular signal to be in the range [0,1]. Thus, RGB=(0,0,0) is monitor black and RGB=(1,1,1) is monitor white. Any three component vector with components in the range [0,1] is a possible input signal to the monitor.

The range of possible colors of the monitor may in theory be determined by displaying all of the possible RGB input combinations (under controlled viewing conditions). Different monitors may display different colors even if they are driven with the same input signal. For example, driving monitors from two different manufacturers with the input (0,0,1) will display different colors if the color of the blue phosphors of the two manufacturers differ.

The communication of color information is often done in a color space that is independent of the particular device. The color spaces commonly used, CIEXYZ (XYZ), CIELAB (Lab), CIELUV and colorimetric or calibrated RGB (calorimetric or calibrated RGB refer to color spaces defined analytically in terms of the other spaces, for example CIEXYZ, and they are not to be confused with device RGB) are tied to a color matching experiment by humans under controlled conditions; see, e.g., R. W. G. Hunt, *The Reproduction of Colour in Photography, Printing and Television*, 5th Edition, Fountain Press, England 1995; and see Brian A. Wandell, *Foundations of Vision Science*, Sinsauer Associates, Inc., Sunderland, Mass. 1995. Today, spectroradiometers, spectrophotometers and colorimeters are instruments available that can measure these numbers without the use of human subjects. The behavior of the monitor can be described in a device-independent color space by measuring the display colors for a large number of input device RGB values in terms of XYZ color space, or more commonly in CIELAB or CIELUV.

The printers commonly used today are typically addressed with four digital values, CMYK, that determine the amounts of cyan, magenta, yellow and black colorants (inks, pigments or dyes) that are deposited on paper or transparencies. In this description, (0,0,0,0) represents no colorant and (1,1,1,1) represents full colorant amounts. Any vector with components in the range [0,1] represents an acceptable input signal to the printer. The color behavior of the printer may be described in a device-independent color space, by measuring the colorimetric values for a large number of printed combinations of input CMYK values.

Assuming a smooth color response to the input signal for the printer, we can use a vector valued continuous function to represent the color response of the printer, $$c = f_p(x), \qquad \text{(Eq. 1)}$$

where $x=(C, M, Y, K)$ is a vector in $R^4$ representing the colorants and $c=(A, B, C)$ is a vector in $R^3$ representing the device-independent colorimetric response to the colorant. Similarly, for the monitor, $$d = f_m(y), \qquad \text{(Eq. 2)}$$

where $y=(R, G, B)$ is a vector in $R^3$ representing the phosphor driving signals and $d=(A, B, C)$ represents the device-independent colorimetric response to the input signals.

For large patches of uniform color on a monitor, the behavior of the monitor is well characterized by the following formula, $$\begin{bmatrix} X \\ Y \\ Z \end{bmatrix} = \begin{bmatrix} m_{11} & m_{12} & m_{13} \\ m_{21} & m_{22} & m_{23} \\ m_{31} & m_{32} & m_{33} \end{bmatrix} \begin{bmatrix} t(R) \\ t(G) \\ t(B) \end{bmatrix} \qquad \text{(Eq. 3)}$$

where t is a linearization or "gamma" function that maps [0,1] to [0,1]) and the matrix M with elements $m_{ij}$ is a 3×3 matrix that accounts for the monitor phosphors. The matrix M is determined if one knows the chromaticities of the phosphors (two chromaticity coordinates, derived from XYZ, describe the colors of the phosphors) and the white point of the monitor.

For printers, there are not yet practical formulas describing $c=f_p(x)$ so the usual representation of $f_p(x)$ involves a table of values together with an interpolation technique such as quaqrieinear interpolation or simplex interpolation; see, Printer-related color processing techniques. Henry R. Kang. In Color Hard Copy and Graphic Arts IV, San Jose, Calif., USA, Vol. 2413, pp. 410–419, Bellingham, Wash., 1995. Society of Photo-Optical Instrumentation Engineers.

If we could form a function $$z = g_p(e) \quad \text{(Eq. 4)}$$

where z is a colorant in $R^4$ and e is a device-independent color description in $R^3$ we would have a device-independent way to select colors to be printed on our printer. The process of forming $g_p$ given the information in $f_p$ is referred to as building a separation table for the printer. The term table is used since a common implementation for the evaluation of $g_p$ consists of a table of values for $g_p$ together with an interpolation technique.

If the printer is a CMYK printer, a device-independent color may be printed using any number of combinations of the CMYK values. A common practice is to use smoothness side-conditions that allow an "inversion" of $f_p$ to build the table $g_p$.

Now we can form the transformation $$z = g_p(f m(y)) \quad \text{(Eq. 5)}$$

to, in theory, provide a faithful transformation from monitor device-dependent RGB, represented in the equation (Eq. 5) by y to printer colorants CMYK, represented in the equation by z. However, there are many monitor colors, say RGB=(0,0,1) that are out-of-gamut for the printer. This means that no combination of CMYK values gives the same color as the monitor RGB=(0,0,1). The printer still needs to print some values of CMYK. Determining the choice of this CMYK (and similarly, determining the choice of CMYK for all of the other out-of-gamut colors) comprises the gamut mapping problem. The gamut mapping strategy is used at the time the table is built in order to select CMYK outputs for those device-independent values, e, that are out-of-gamut.

To print an image, input values are transformed by interpolation in the multi-dimensional table, regardless of whether the nodes are in-gamut or out-of-gamut. The gamut mapping is implicit in the table constructed.

Figure 1:
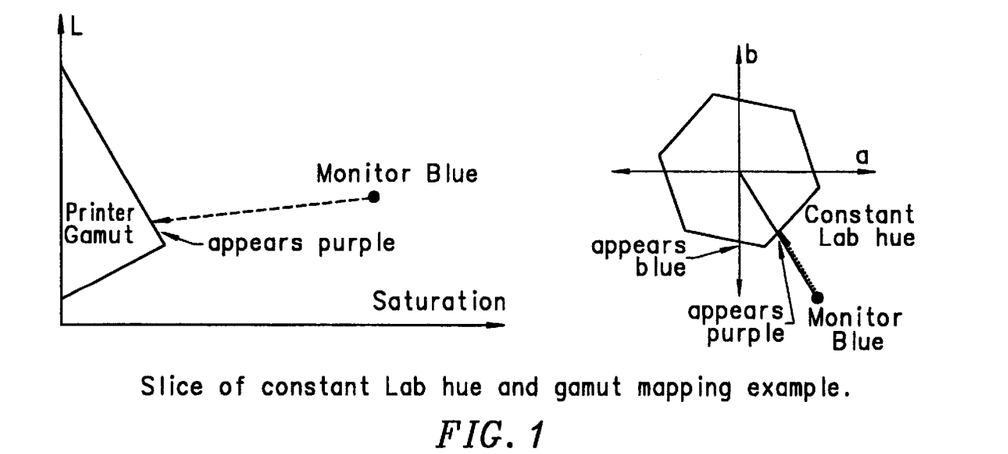
FIG. 1 shows a gamut mapping strategy of the prior art.

An example of a gamut mapping strategy is to map along lines of constant hue, defined to be, $\tan^{-1}(b/a)$ in CIELAB space. A common problem with this approach is that the Lab colors corresponding to monitor blues will map to a color that will appear purple on print, as shown in FIG. 1. This problem occurs because, even though Lab is known as a "uniform" color space, it is not true that a series of colors along a constant Lab hue result in colors of the same name. A set of colors of constant color name would lie on a curve in Lab space, and not on a constant Lab hue line.

Several more elaborate gamut mapping techniques have been developed which perform various warps on the color space in order to take into account the curvature of perceived hue in the color spaces in order to provide better gamut-mapping techniques. For example, the gamut mapping process described in U.S. Pat. No. 5,438,649 attempts to modify the hue angle of values stored in a color separation table after the separation table has been created. Another elaborate gamut mapping technique is described in U.S. Pat. No. 5,539,540. This patent describes the use of different gamut mapping strategies such as one employing a traditional compression technique for a portion of an image to be printed and the use of another color-mapping strategy that works for business graphic images on a different region of the image and then warping the two to preserve continuity and smoothness using a computer morphing technique. These two examples of elaborate gamut-mapping techniques provide certain advantages, but nonetheless are relatively complicated and are complex to control. The warping technique may be computationally burdensome to a digital image processing system.

It is desirable to provide an enhanced gamut-mapping technique which corrects for gamut limitations of an output color device while at the same time imposing fewer computational burdens and also allowing ease of control over the gamut mapping process.

SUMMARY OF THE INVENTION

In one aspect of the present invention, an improved gamut mapping technique consists of redefining the red, green, and blue monitor chromaticities to values for which corresponding hues appear as intended. This technique in effect defines a predefined color space for use in gamut correction where the predefined color space is based upon a set of redefined monitor chromaticities which are typically used in the transformation function for transforming color values from one color space, such as RGB, to another color space. In a typical implementation of this aspect of the present invention, the technique consists of generating the appropriate color separation tables using a normal gamut mapping strategy with typical monitor chromaticities and again generating a color separation table, typically the same size as the first color separation table, using the new monitor chromaticity values. A gamut surface generated using the original chromaticities is then used to determine what is in gamut and what is out of gamut. The two color separation tables are then combined such that points which lie in gamut use the values from the first color separation table while points which lie out of gamut use values from the second color separation table. To prevent potential harsh transitions between points lying near the gamut surface, one embodiment of the present invention uses a blending function to blend these points by combining values from the two separation tables. Using this technique, colors which fall in gamut still appear as intended, while color values which are out of gamut now map to colors which subjectively more closely resemble the intended colors.

In another aspect of the present invention, two complete color separation lookup tables are created and then combined. A first color separation table is created, where this table determines a conversion from a first set of color values to a first set of colorant values. A second color separation table is also created, which table determines a conversion from the first set of color values to a second set of colorant values. Then a final color separation lookup table is created by using the first set of colorant values and the second set of colorant values.

The methods of the present invention may be practiced by the use of a color printer lookup table or by hardware or a hardware and software combination. For example, a lookup table according to one embodiment of the present invention provides colorant values in a colorant space given a corresponding color in a first color space. The lookup table has a first set of values and a second set of values. The first set of values are derived from a first color space to colorant conversion. This first set is used to provide a colorant value for a color in the first color space which is within a gamut of a color printer or other color output device. The second set of values is derived from a predefined color space to colorant conversion process, where the predefined color space is for use in gamut correction due to gamut limitations of the output device. The predefined color space is specified by a set of redefined monitor chromaticities.

A process for printing a color image according to the present invention is also described. In this process, an input color specified by input color values is received, and these input color values are used to obtain values from a memory, such as RAM, which contains a data structure, such as a lookup table, having the first set of values and the second set of values. If the input color values are in gamut (of the output device) then the first set of values is used to provide a colorant value. If the input color values are out of gamut then the second set of values derived from a conversion between the predefined color space and the colorant space is used to provide a colorant value.

The present invention also provides a blending technique in order to blend values in the first and second set of values for those color input values which are near the gamut surface of the output color device.

DETAILED DESCRIPTION OF THE PRESENT INVENTION

Methods and apparatuses will now be described for providing gamut correction in a color separation process which involves converting color information from one color space to another color space. In the following description, numerous specific details are set forth, such as specific color spaces, specific color space conversions, specific hardware and software architectures, and specific examples of color separation lookup tables, etc., in order to provide a thorough understanding of the present invention. It will be evident, however, to those skilled in the art, that these specific details need not be used to practice the present invention. In other instances, well-known structures, methods, and architectures have not been shown in detail in order to avoid unnecessarily obscuring the present invention.

Figure 2:
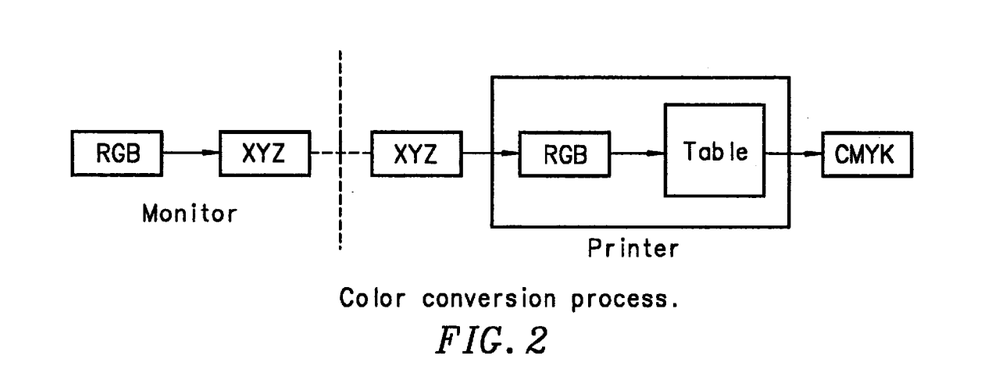
FIG. 2 shows a prior art implementation of a color separation system using a lookup table.

The foregoing description provided a theoretical background for color conversions. In practice, the colors displayed on a monitor are converted to a device-independent color space (e.g., CIEXYZ) which are then converted to the device-dependent color space of the desired output device. This process is shown in FIG. 2. This is accomplished by using the profile of the input device in connection with the profile of the output device. The profile for a device contains the transformation used to convert from a device-independent color space to the device-dependent color space of the device and/or the transformation used to convert from the device-dependent color space of the device to a device-independent color space.

A typical profile used by a printer contains transformations from XYZ to the color space of the output device (e.g., CMYK):

XYZ→CMYK. For printing devices, this model (an example of which is described in *PostScript Language Reference Manual, 2nd Ed.*, Adobe Systems, Addison-Wesley, Reading, Mass. 1990) is usually expanded internally to contain an intermediate color space (e.g., calibrated nonlinear RGB) which is used to perform table lookups which produce corresponding output device components:

XYZ→RGB→CMYK

Addressing the lookup table using the intermediate colorimetric RGB space instead of XYZ results in less visually perceptible interpolation errors.

When printing device-independent colors to a printer, the input XYZ tristimulus values are converted to RGB values, for a synthetic color monitor, using the inverse of the matrix and the inverse of the t function defined by (Eq. 3). The resulting RGB values are then used to produce corresponding CMYK values, by accessing a 3-D lookup table containing CMYK values, interpolating CMYK values where necessary. Using an intermediate RGB space offers several potential advantages. Using the intermediate RGB values to index the lookup tables, when using tables on a uniform grid, may result in a higher percentage of in-gamut nodes than an XYZ table. In addition, interpolation errors on a non-uniform RGB space may be perceptually less visible than interpolation in XYZ. Finally, source colorimetric images in RGB require less transformations to preview on a monitor than the equivalent XYZ or Lab images.

Table Generation

Figure 3:
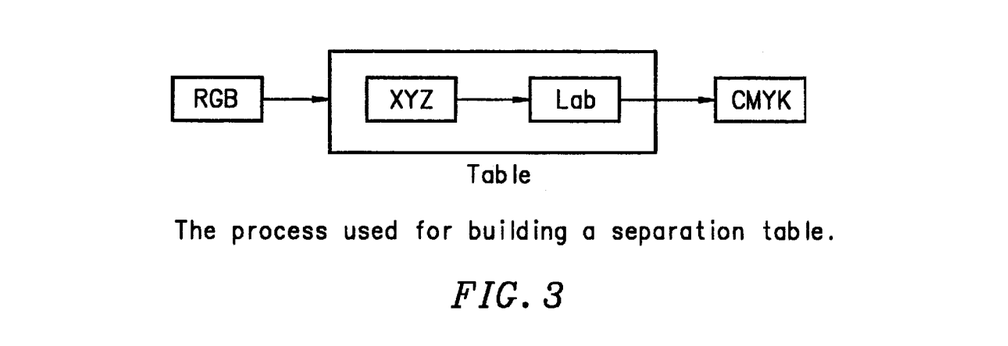
FIG. 3 shows a prior art process for preparing a color separation table.

The lookup table for the printer is generated prior to its use in printing. The table is generated by determining the CMYK values associated with each of the RGB nodes addressing the table. During generation of the table, the CMYK value to be placed in the table is obtained by converting the RGB components of each node to XYZ, converting XYZ to some uniform color space (e.g., CIELAB), then converting from the uniform color space to CMYK, as shown in FIG. 3.

It is within this final step of the transformation that the gamut mapping takes place. For the case of gamut clipping (where in-gamut colors are not modified), a search for the Lab value within the output color space is performed. If it is found, the corresponding CMYK output color is placed into the lookup (separation) table. Otherwise, a gamut mapping is performed to determine the best color to use in place of the actual desired color.

Although the CIELAB color space is described as being uniform, in actuality, it is not so. In particular, straight lines of constant perceived hue do not correspond to straight lines in the Lab space. Therefore, some colors which fall out-of-gamut are mapped to incorrect colors (their color names change) using a traditional gamut mapping strategy. This is most apparent with blue. The blue seen on a typical monitor is well out-of-gamut on a typical printer. Interestingly enough, if one looks at the lab constant hue slice corresponding to a monitor blue, the colors on the gamut surface of a typical printer will be purple except at the very darkest colors. Since several gamut mapping strategies keep a constant hue in a CIELAB, this results in monitor blue appearing as a shade of purple.

Several elaborate gamut mapping techniques have been developed which perform various warps on the color space in order to take into account the curvature of hue in the intermediate color spaces. Instead, a much simpler technique is presented in various embodiments of the present invention. One embodiment of the new technique consists of the combination of two tables that are produced by some conventional table generation method. For example, a conventional table generation method with hue-preserving gamut mapping can be the starting point of the new approach. The first table is built using a standard colorimetric RGB color space, and the second table is built using a modified colorimetric RGB color space, created by redefining the red, green, and blue chromaticities used in generating the lookup table. Most monitor manufacturers have chosen red, green, and blue chromaticities that are actually reddish-orange, yellowish-green, and purplish-blue, respectively. See points 43, 42, and 41 in FIG. 4. These chromaticities work well with monitors, but, due to the limited gamut size of most printers, map several, well out-of-gamut colors to colors of different color names. The redefined red, green, and blue chromaticities should be selected such that they fall within, or closer, to the correct color region in the chromaticity diagram (see FIG. 4 which shows one example of the redefined chromaticities 47, 46 and 45 for red, green and blue).

The gamut surface generated during the construction of the first separation table, using the first set of chromaticities, is then used to determine what is in-gamut and what is out-of-gamut. The two separation tables are then combined such that colors which lie in-gamut use the values from the first separation table, while colors which lie out-of-gamut use values from the second separation table. To prevent potential harsh transitions between colors lying near the gamut surface, a blending function (described below) is applied, combining colors from the two separation tables.

Using this technique results in colors which fall in-gamut to still appear as intended, while colors out-of-gamut now map to colors which subjectively more closely resemble the intended colors.

The new chromaticities are only used in the table building process. The first set of synthetic monitor chromaticities are still used to covert from XYZ to the intermediate RGB color space for lookup in the combined separation table in the final profile.

Converting RGB to XYZ

To convert from calibrated nonlinear RGB to XYZ, the phosphors and illuminant of the synthetic monitor need to be known. For example, the synthetic monitor could use the SME phosphors and the D50 illuminant which have the following chromaticity values:

|   | x | y |
|---|---|---|
| R(red) | 0.630 | 0.340 |
| G(green) | 0.310 | 0.595 |
| B(blue) | 0.155 | 0.070 |
| W(white) | 0.3457 | 0.3586 |

The z component is simply 1−x−y.

A 3×3 matrix may be used to convert from linear RGB to XYZ and is constructed from the synthetic monitor phosphors and illuminant by:

Mdiag($M^{-1}w$)

where $$M = \begin{bmatrix} x_R & x_G & x_B \\ y_R & y_G & y_B \\ z_R & z_G & z_B \end{bmatrix} \quad \text{and} \quad w = \begin{bmatrix} x_W/y_W \\ 1 \\ z_W/y_W \end{bmatrix}.$$

From the example chromaticities, this yields the following transformation:

$$\begin{bmatrix} X \\ Y \\ Z \end{bmatrix} = \begin{bmatrix} 0.4689 & 0.3566 & 0.1386 \\ 0.2530 & 0.6844 & 0.0626 \\ 0.0223 & 0.1093 & 0.6930 \end{bmatrix} \begin{bmatrix} t(R) \\ t(G) \\ t(B) \end{bmatrix}$$

where t is a linearization or "gamma" function. This linearization function is commonly used in the TV and computer industry to describe the non-linear response of the light output to the input driving voltage signal of a monitor. For abstract colorimetric color spaces, there is an advantage in using a space with non-linear t since quantization in such non-linear spaces results in errors that are more visually uniform, and thus less visible for a given number of bits. An abbreviated form of this transformation may be written as:

$$\begin{bmatrix} X \\ Y \\ Z \end{bmatrix} = f \begin{bmatrix} R \\ G \\ B \end{bmatrix}$$

where $f$ is the transformation matrix noted above.

To generate the second separation table, a new set of synthetic monitor phosphors is chosen. The second set of chromaticities should be selected such that out-of-gamut colors will map closer to the same color name. For example, the following set of chromaticities (used to derive the transform matrix f' as indicated below) will cause blue to map to a hue on print which appears more like the blue on the typical monitor.

|   | x | y |
|---|---|---|
| R(red) | 0.730 | 0.260 |
| G(green) | 0.288 | 0.645 |
| B(blue) | 0.101 | 0.105 |

Converting XYZ to Lab

Given XYZ tristimulus values, a corresponding Lab value can be computed with the following equations:

$$L = 116 f\left(\frac{Y}{Y_n}\right) - 16$$

$$a = 500\left[f\left(\frac{X}{X_n}\right) - f\left(\frac{Y}{Y_n}\right)\right]$$

$$b = 200\left[f\left(\frac{Y}{Y_n}\right) - f\left(\frac{Z}{Z_n}\right)\right]$$

where $$f(t) = \begin{cases} t^{\frac{1}{3}} & \text{for } t > 0.008856 \\ 7.787t + 16/116 & \text{otherwise} \end{cases}$$

and $X_n$, $Y_n$, and $z_n$ are the white point tristimulus values.

Converting LAB to CMYK

To convert from Lab to CMYK, one needs to "invert" the color response (measured Lab values) described by the measurements to provide resulting CMYK values. This inversion process is not unique: it is possible for some Lab values to be printed by many combinations of CMYK. An additional constraint can be used to allow a unique inversion of the measurements to provide a conversion table from Lab to CMYK. This inversion only works for those colors (Lab values) that are within the gamut of the printer. For the colors that are out-of-gamut, a gamut-mapping procedure is necessary. One example of gamut-mapping described herein is one that keeps constant Lab hue. In other words, colors that are out-of-gamut will be mapped to a color of the same Lab hue. Even for constant hue gamut mapping, there are free parameters that allow for the adjustment of the appearance of gamut-mapped images. The details of a particular gamut mapping, however, do not limit the application of gamut-mapping approaches of this invention. The gamut mapping approach of the present invention also applies to other gamut mapping strategies besides hue-preserving ones.

Combining Separation Tables

Once two separation tables have been created as described in one embodiment of the present invention, a new combined separation table is generated. For each node in the new combined separation table, a new CMYK value may be obtained by choosing a CMYK from the first separation table for colors which fall in-gamut, and a CMYK from the second separation table. To prevent discontinuities in the new combined separation table, a blending function which smoothly combines the CMYK values from the two tables near the gamut surface may be used.

Figure 10:
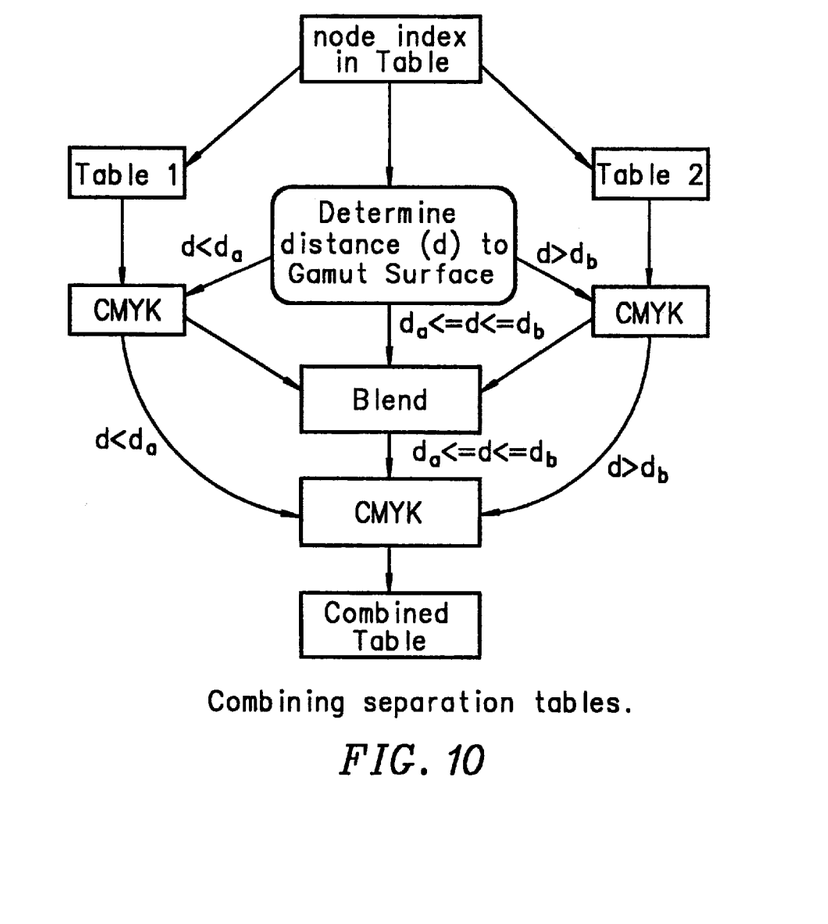
FIG. 10 shows one method for combining separation tables.

Colors failing in-gamut are defined to have a negative distance away from the surface, while colors out-of-gamut are defined to have a positive distance away from the surface. Colors which have a distance d away from the gamut surface and $d_a < d \leq d_b$, where $d_a \leq 0$ and $d_b \geq 0$, are blended or combined. Let $(C_1, M_1, Y_1, K_1)$ be a color in the first separation table (e.g. Table 1 of FIG. 10) and $(C_2, M_2, Y_2, K_2)$ be the corresponding color in the second separation table (e.g. Table 2 of FIG. 10). The new combined CMYK value is obtained by the following equations:

$$C = (1-d_n)C_1 + d_n C_2$$

$$M = (1-d_n)M_1 + d_n M_2$$

$$y = (1-d_n)Y_1 + d_n Y_2$$

$$K = (1-d_n)K_1 + d_n K_2$$

where $$d_n = \frac{d - d_a}{d_b - d_a}.$$

This blending process is shown in FIG. 10.

Examples of Digital Image Processing Systems

Figure 6:
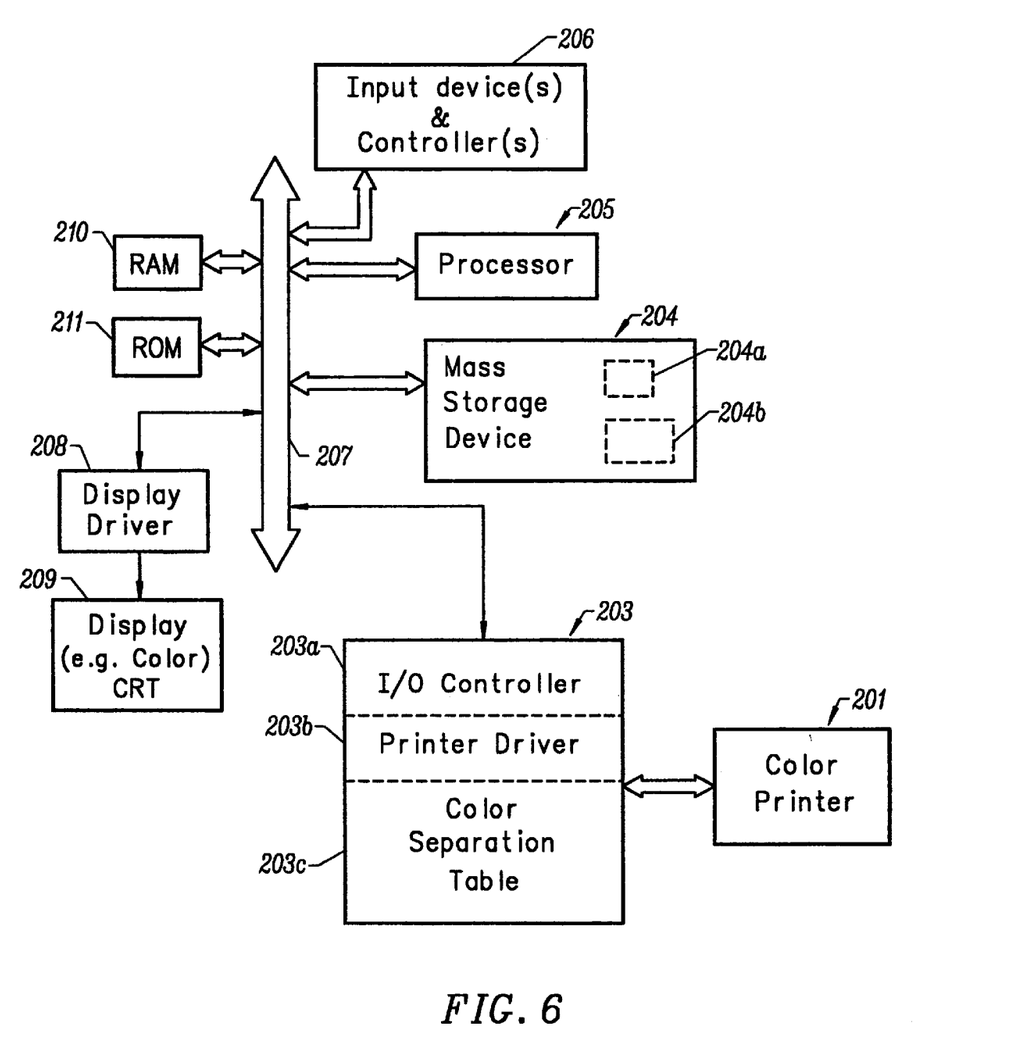
FIG. 6 shows an embodiment of an apparatus according to the present invention which includes a digital image processing system and a color printer.

An embodiment of the present invention will be described in the context of a digital image processing system which, in one exemplary embodiment, is a general purpose computer system coupled to a color printer. FIG. 6 shows an example of such a digital image processing system. This system includes a color printer 201 which is coupled through an input/output controller 203 and through a bus 207 to a processor 205 and a mass storage device 204. The color printer 201 may be a three or four ink printer such as a CMYK inkjet printer. The input/output controller 203 would typically utilize conventional input/output controller hardware and printer driver software in conjunction with a color separation table according to the present invention such as table 203c. The bus 207 may be a conventional computer bus or peripheral bus which is coupled to the various components of a general purpose computer system. The processor 205 may be a single chip microprocessor such as a Pentium, Pentium Pro, or PowerPC microprocessor (or other RISC or CISC microprocessors). The mass storage device 204 may be a hard disk or other disk drive system or may be a CD ROM drive. The mass storage device 204 may contain color separation tables 204a for various color printers which may be coupled to the computer system. These color separation tables may be the lookup tables of the present invention in order to provide for the improved gamut correction of the present invention. Further, the mass storage device 204 may include an executable computer program and associated data for generating the color separation lookup tables of the present invention. The associated data may include the gamut information for the various printers and monitors which may be used with the computer system and may further include the normal and redefined transformation functions described herein which are used in generating the two different color separation lookup tables of the present invention. It will be appreciated that once a color separation lookup table of the present invention has been generated, it may be downloaded from the mass storage device or from the RAM 210 into the controller 203 to be stored as the table 203c. The RAM 210 may be considered to be the "main" memory of the computer system and the ROM 211 stores necessary boot-up and low-level control computer programs. The computer system shown in FIG. 6 further includes a display device 209 which is typically a color CRT which is driven by a display driver 208 which may be considered to be a display controller and associated software drivers for controlling the display device 209. The computer system also includes various input devices 206 and associated controllers. These may include a keyboard and a mouse, as well as other possible conventional input devices. For example, a color scanner and its associated controller may be an input device. This input device would allow the user of the computer to scan in an original color image and then display it on the display 209 (for example, for the purpose of "soft" proofing), perhaps modify it, and then print the image on the color printer 201.

It will be appreciated that the color separation lookup table of the present invention, such as table 203c, is typically generated once upon the selection of a particular color printer for use with a computer system or other digital image processing system. The color separation table is generated after determining the identification of the specific color printer 201 which is coupled to the digital image processing system and a determination of its gamut surface in a color space such as the Lab color space. This will, in effect, generate a gamut surface in the color space which represents the in gamut colors and the out of gamut colors; specifically, the in gamut colors will be within the volume enclosed by the gamut surface, and the out of gamut colors will be outside of the volume. Once a color separation lookup table of the present invention has been generated for a particular color printer, this table may be saved in the mass storage device or may be provided to a user on a computer storage media such as a disk or CD ROM for the user's use without having to regenerate the color separation table for a specific color printer. The user will then use the computer storage media to provide the color separation data to the computer system which will then use it in the manner described herein.

Figure 5:
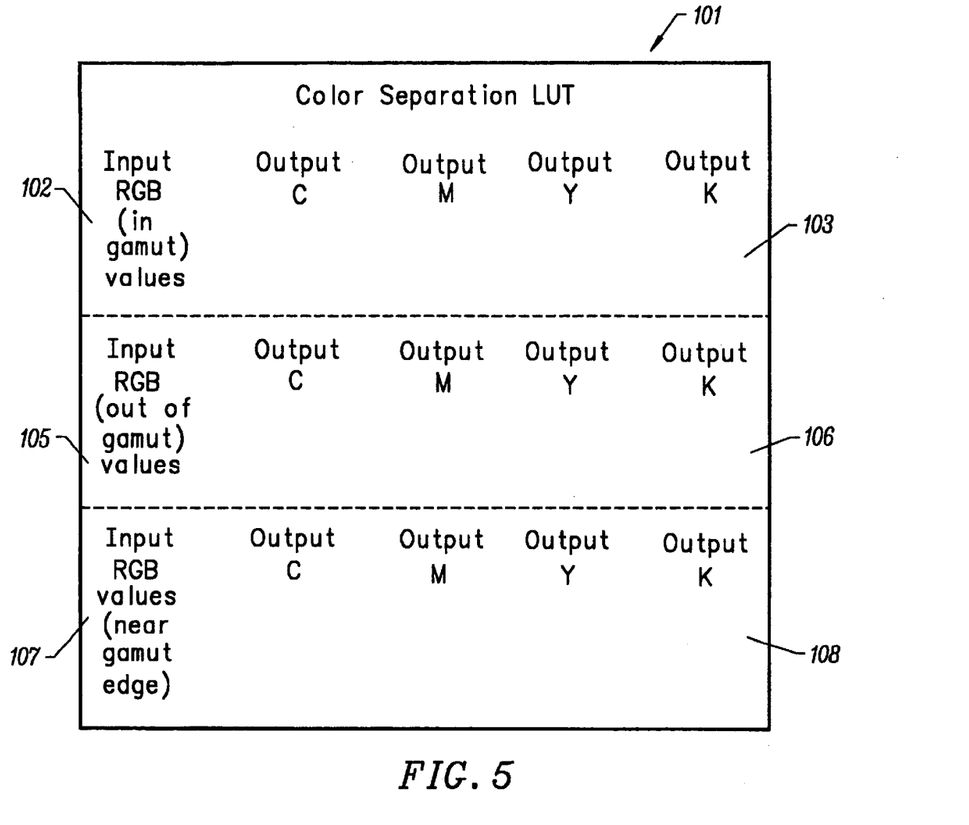
FIG. 5 shows an embodiment of a lookup table of the present invention.

FIG. 5 shows an example of a color separation lookup table (LUT) 101 according to the present invention. This table includes an input ("address") portion 102 for storing input RGB values which are within the gamut surface of a particular color printer (by more than a predetermined value) and includes the corresponding output CMYK values 103. It will be appreciated that there are typically four corresponding output values for the triplet of corresponding input values. Typically, there will be a plurality of input RGB values 102 and a corresponding plurality of output CMYK values 103. The lookup table 101 also includes a plurality of input RGB values which are out of gamut 105 by more than a predetermined value. There are also a corresponding plurality of output CMYK values 106. Also provided in the lookup table 101 is a plurality of RGB values 107 which are near the gamut edge and a corresponding plurality of output CMYK values 108 which correspond to the input RGB values 107. This portion of the lookup table contains blended output values which have been obtained by blending values in a first color separation table that was used to generate the values 103 and output CMYK values from a second color separation table which was used to generate the output CMYK values 106. It will be appreciated that the values 102 will be typically RGB values which are within the gamut but not "near" the gamut surface as described herein. Specifically, RGB values which are near the surface but within the gamut will have blended output values. As noted above, this lookup table 101 may be generated and then stored on a computer readable storage medium such as a floppy disk or a CD ROM and then supplied to a user for use with a specific printer and possibly also with a specific computer monitor. In that way, the computer user does not have to generate this lookup table for the specific printer but rather uses the resultant table 101.

Figure 7:
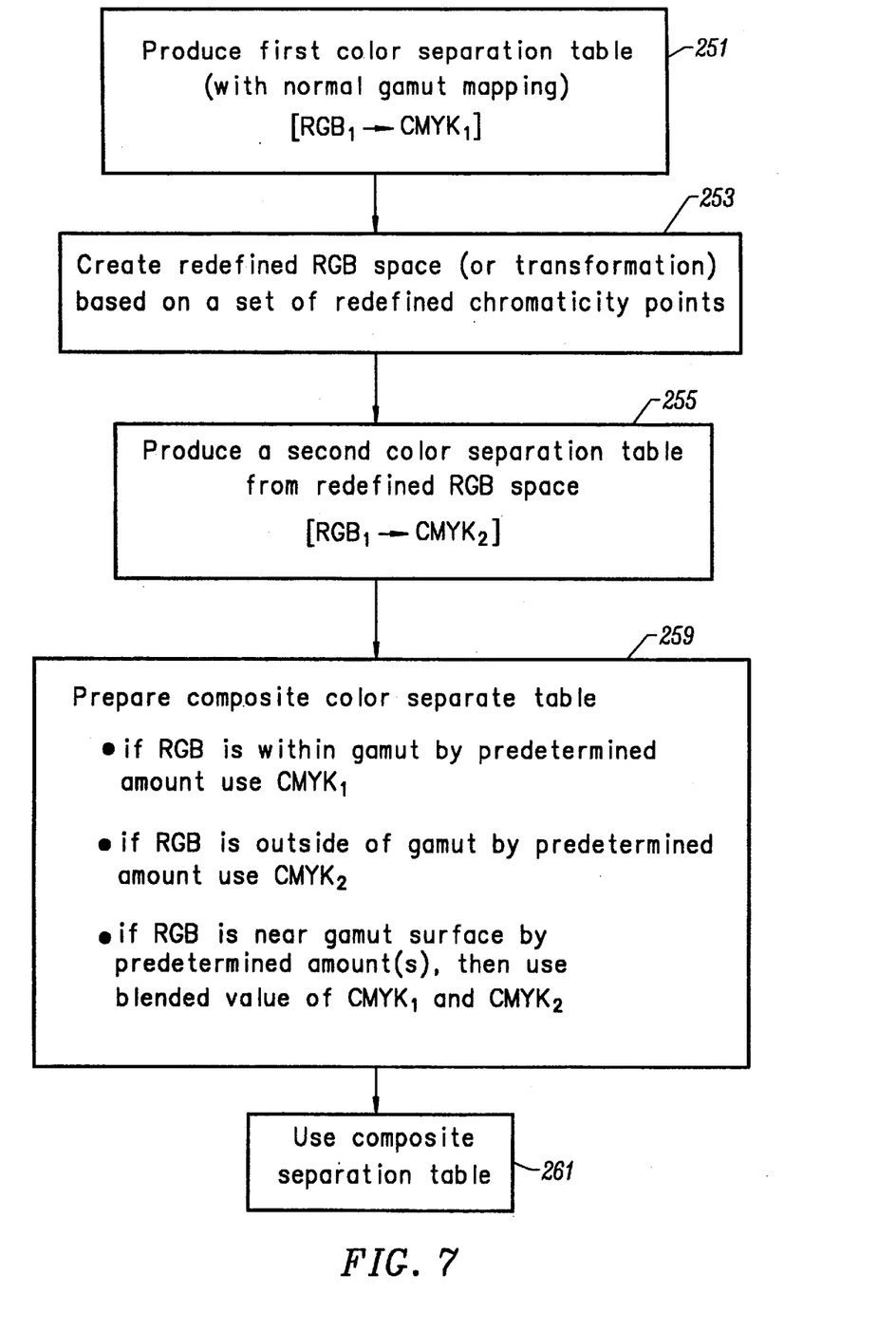
FIG. 7 shows a method according to one embodiment of the present invention for providing an improved gamut mapping technique.

FIG. 7 shows an embodiment of a method of the present invention for generating a color separation lookup table, such as the table 101. The method begins in step 251 in which a first color separation table is produced with normal gamut mapping techniques. At this point, a gamut surface for a particular color printer (and perhaps for a particular color monitor) is determined, and then the first color separation table is produced. The gamut surface will be used to determine whether the output CMYK value for a particular RGB index value will be from the first color separation table or from the second color separation table or from a blended value of both tables. This step 251 may utilize conventional procedures for normal gamut mapping and for generating a color separation table. In one embodiment of the invention, the method iterates through selected index values, each of which is a triplet of RGB values, to generate corresponding CMYK values; however, the RGB triplet values are first converted to the XYZ color space and then to the Lab color space before determining the final CMYK colorant values. The first step in converting from RGB to XYZ space is implemented by transformation function $f$ (which may be a matrix of values) which has been described herein.

Figure 9:
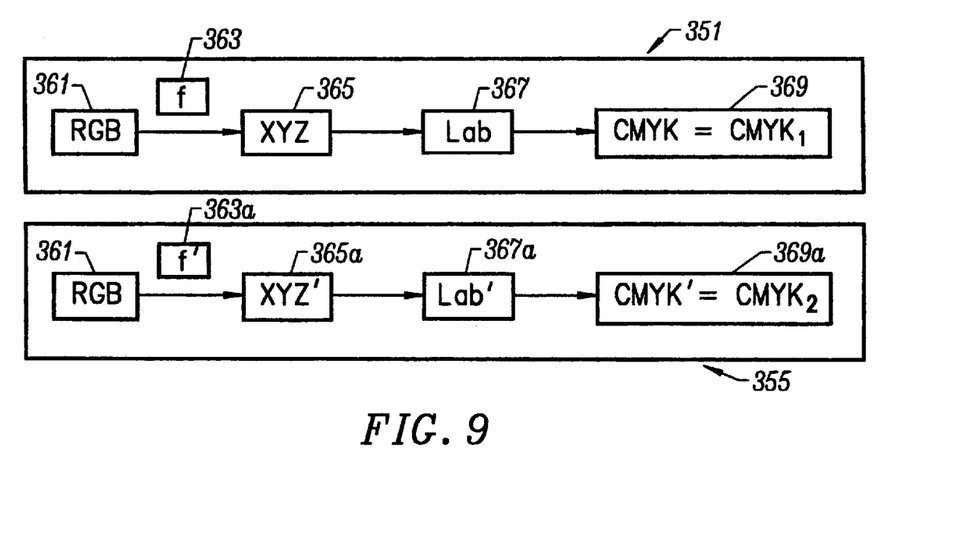
FIG. 9 shows one embodiment for creating two color separation tables according to the present invention.

The transformation function $f$ provides the matrix of values necessary to convert from the RGB color space to the XYZ color space. This function is also shown in FIG. 9 as the function 363 which converts from the RGB input 361 to provide an XYZ value 365. It will be appreciated that the procedure 351 shows the conversion from an RGB index value (which will be used as an index or input to the final lookup table) to the final output CMYK value 369 which corresponds to the input RGB value 361. Thus, the color separation procedure 351 begins with a particular index RGB value 361 which is transformed through the function 363 to an XYZ value 365 and then to a Lab value 367 and finally to an output CMYK value which will be one of the values in a first set of colorant values generated for the first color separation lookup table. It will be appreciated that a "white" point is also specified in the XYZ space as shown above. It will also be appreciated that this first step 251 utilizes the conventional monitor chromaticities specified in the function f and thus produces a conventional color separation table.

Figure 4:
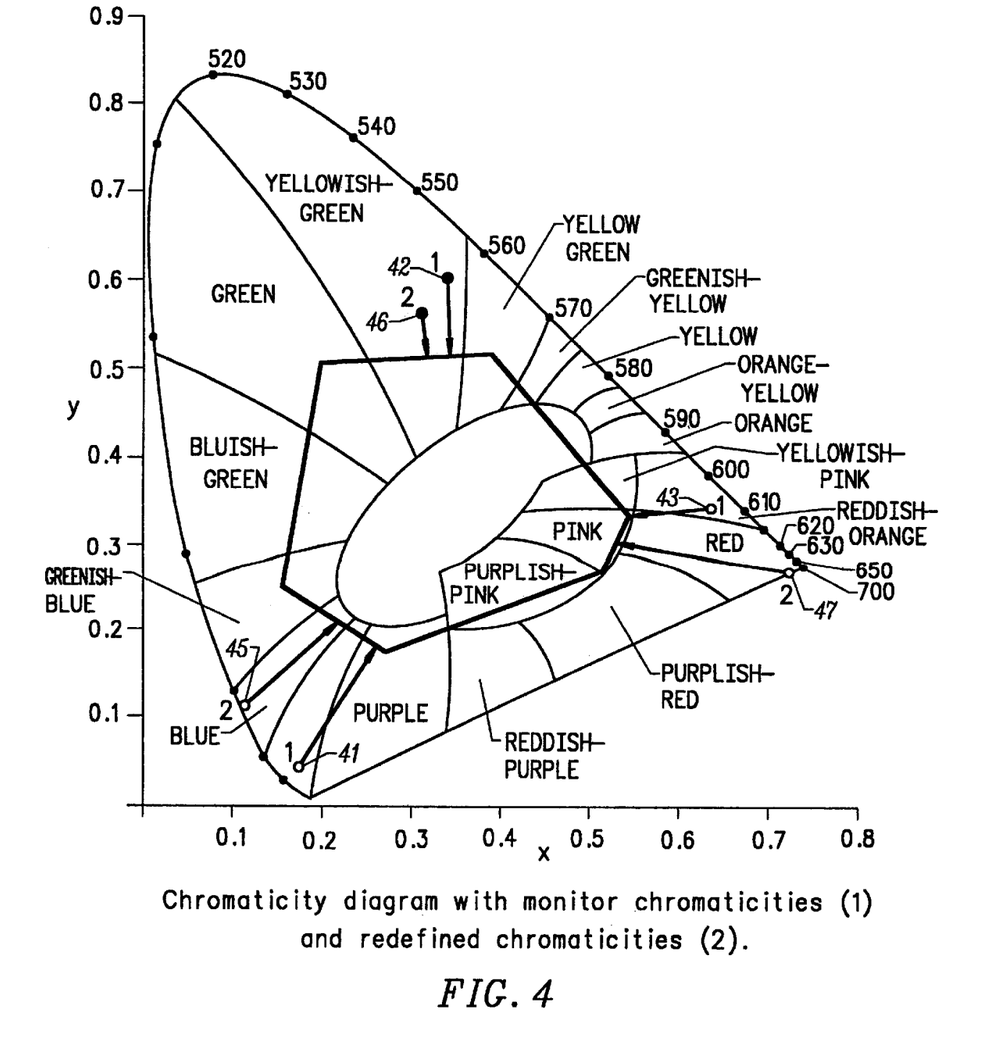
FIG. 4 shows a chromaticity diagram having original monitor chromaticity values and redefined chromaticity values.

Then in step 253, a redefined RGB space, or a redefined RGB transformation is created based upon a set of redefined chromaticity points. These redefined chromaticities are values for the red primaries, the green primaries, and the blue primaries as well as the white point which have been redefined to cause blues on a monitor to print as blues on a printer (rather than purplish blues) and similarly to cause a red on the monitor to print as a red rather than an orangeish-red. Examples of these redefined chromaticities are shown in FIG. 4 as redefined Red chromaticity 47, redefined Green chromaticity 46, and redefined Blue chromaticity 45. This redefined RGB space or transformation is created by modifying the function $f$ so that it is now $f'$. In particular, the values in the function $f$ are reset to correspond to the redefined chromaticity points such that a transformation from an RGB index value 361 results in the transformed value XYZ' shown as 365a in FIG. 9. In one exemplary embodiment of the present invention, the values for the function $f'$ may be obtained from "synthetic monitor phosphors" described above.

After a redefined RGB space or transformation from an RGB space has been created in step 253, then a second color separation lookup table is generated from the redefined RGB space or transformation in step 255. In an example of the process of this step, the same set of RGB index values or input values 361 are transformed by the function $f'$ (363a) to provide various output CMYK values 369a. This is shown in the procedure 355 of FIG. 9. Thus, a second color separation table, typically the same size as the first color separation table, is generated using the same set of color index values in RGB space shown as 361 through a modified transformation 363a and then through the XYZ' and the Lab' spaces 365a and 367a, respectively. Finally, a set of colorant values which are the output values for this second color separation table are produced as $CMYK_2$. It will be appreciated that steps 251 and 255 may be performed in a reversed order.

Step 259 produces a composite color separation table containing values from one of the two color separation tables or, if blending is used, for blended values if the RGB index is near the gamut surface. It will be appreciated that one embodiment of the present invention may not use the blending described herein and rather use an output value for a particular index value from only one of the two color separation tables. In one embodiment of the present invention, blending may be performed if an index RGB value is near the gamut surface where near is defined as being within in one exemplary embodiment sixteen units inside of the gamut surface (units being in Lab space, where the distance "D" is a Euclidean distance to the gamut surface) to a distance of 48 units outside of the gamut surface. A blending function may be in this case $G=(D+16)+64$, and thus the final blended output value will be equal to $CMYK_1$ $(1-G)+CMYK_2 \times G$. Thus index points with a distance further than 16 units inside of the gamut surface will use $CMYK_1$ values from the first color separation table, while points greater than a distance of 48 units outside of the gamut surface will use a value only from the second color separation table (CMYK$_2$). The range used in calibrating the blend may be varied. This will assist in the smooth transition between separation tables and will prevent irregularities (such as sharp transitions) from appearing on the printed image. In this embodiment, a linear blend is performed, but different ranges and a non-linear combination function could be used. After the composite color separation table has been prepared in step 259, then the composite separation table may be used in step 261. While various embodiments of the invention have assumed that the input values to the color separation table are RGB values, it will be appreciated that other input values specified in other color spaces may be used. For example, inputs in LUV or YCbCr spaces may be used.

Figure 8:
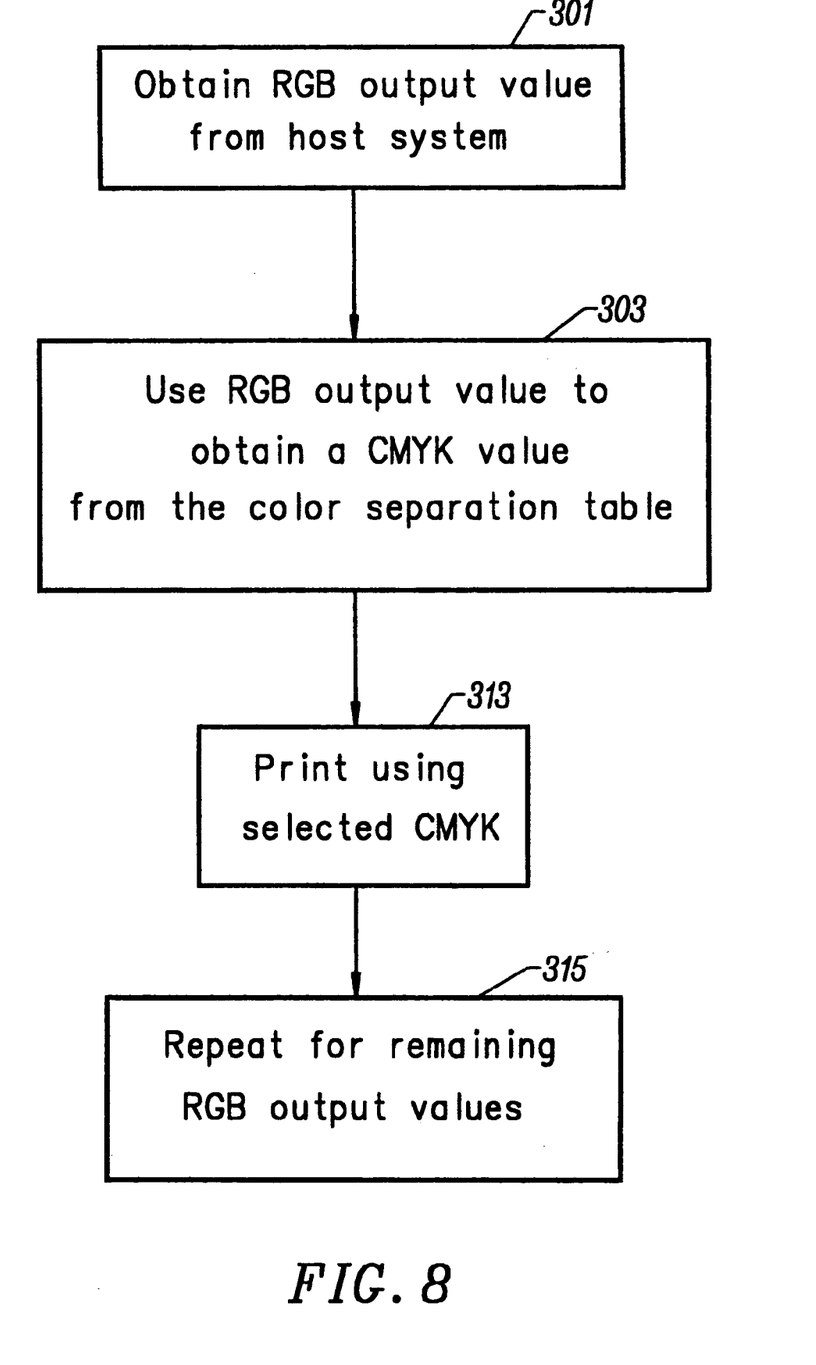
FIG. 8 shows a method according to the present invention for using a data structure, such as a color separation lookup table, of the present invention.

FIG. 8 shows a method for using a color separation table of the present invention. This figure also shows a method for printing according to embodiments of the present invention. This method begins in step 301 in which an RGB output value is obtained from the host system. In one example, the RGB value may be obtained from the RAM 210 shown in FIG. 6 and supplied to the I/O controller 203 which will then cause the selection of a particular colorant value in the output portion of the color separation table 203*c*. The procedure continues in step 303 in which the RGB output value is used to obtain an output colorant (CMYK) value. If the RGB output value is within the gamut surface and not near the gamut surface, then a colorant CMYK output value is obtained from the first set of colorant values calculated in step 251 and which were in the first color separation table. That is, a colorant value (CMYK$_1$) originating from the first color separation table is obtained. If the RGB output value is not within the gamut but is near the gamut surface, then a blended CMYK value derived from the first and second sets of colorant output values in the two color separation tables is obtained. If the RGB output value is not near the gamut surface and is outside of the surface, then a colorant value CMYK$_2$ derived from the second set of colorant values stored in the original second color separation table is obtained in step 311. After printing using the selected CMYK value in step 313, processing may be repeated in step 315 for the remaining RGB output values in order to generate a color image on the medium being used by the color printer.

The present invention produces colors which fall in gamut that still appear as intended while at the same time color points out of gamut now map to colors which subjectively more closely resemble the intended colors. At the same time, the processing overhead associated with the present invention is greatly reduced relative to the elaborate gamut mapping techniques of the prior art.

The foregoing invention has been described by way of specific examples which illustrate the invention and are not to be construed as limiting the invention which is defined by the following claims. Many alterations and modifications of the present invention will be appreciated by those of ordinary skill in the art after having read the foregoing description.

What is claimed is:

1. A method for correcting for gamut limitations of a color output device, said method comprising:

providing conversion from a first color space to a first set of values in an output color space:

creating a predefined color space for use in gamut correction due to said gamut limitations, said predefined color space being produced by redefining chromaticities of said first color space to a second set of values in said output color space; and producing a color data value for each input value from both the second set of values for said predefined color space and said first set of values for said color space.

2. A method as in claim 1 wherein said second color space is an ink colorant color space and said set of color data values forms a color separation table.

3. A method as in claim 1 wherein said predefined color space is based upon a transformation function having a set of redefined chromaticities.

4. A method as in claim 3 wherein said set of redefined chromaticities comprises three sets of values specifying three primary colors.

5. A method as in claim 4 wherein said set of redefined monitor chromaticities further comprises a value specifying a white point.

6. A digital processing system for correcting for gamut limitations of a color output device, said system comprising:

means for effecting conversion from a first color space to a first set of values in an output color space;

means for creating a predefined color space for use in gamut correction due to said gamut limitations, said predefined color space being produced by redefining chromaticities of said first color space to a second set of values in said output color space; and means for producing a color data value for each input value from both the second set of values for said predefined color space and said first set of values for said first color space.

7. A system as in claim 6 wherein said second color space is an ink colorant color space and said set of color data values forms a color separation table.

8. A system as in claim 6 wherein said predefined color space is based upon a transformation function having a set of redefined chromaticities.

9. A system as in claim 8 wherein said set of redefined chromaticities comprises three sets of values specifying three primary colors.

10. A method of creating a set of data values representing a color separation said method comprising:

creating a first color separation from a first color space to values in an output color space;

creating a predefined color space from said first color space and based upon a set of redefined chromaticities for use in gamut correction due to gamut limitations of a color output device;

creating a second color separation for converting values of colors in the predefined color space to values in said output color space;

creating said color separation by using both a plurality of first values from said first color separation and using a plurality of second values from said second color separation for each input value.

11. A method as in claim 10 further comprising:

determining a gamut definition for said color output device.

12. A method as in claim 11 wherein said predefined color space is based upon a transformation function having a set of redefined chromaticities.

13. A method as in claim 12 wherein said set of redefined chromaticities comprises three sets of values specifying three primary colors.

14. A method as in claim 10 further comprising:

blending at least some of said plurality of first values with at least some of said plurality of second values to provide a plurality of blended values in said color separation lookup table.

15. A method as in claim 14 wherein said first color separation table determines a conversion of values from a first color space to said colorant space.

16. A method as in claim 15 wherein said step of creating said first color separation table comprises:
   determining a plurality of first colorant values in said colorant space for a corresponding plurality of color values in said first color space.

17. A method as in claim 16 wherein said step of creating said second color separation table comprises determining a plurality of second colorant values in said colorant space for said corresponding plurality of color values in said predefined color space.

18. A digital processing system for creating a set of data values representing a color separation lookup table, said system comprising:
   means for creating a first color separation table from a first color space to a first set of values in an output color space;
   means for creating a predefined color space from said first color space and based upon a set of redefined chromaticities for use in gamut correction due to gamut limitations of a color output device;
   means for creating a second color separation table for converting values of colors in the predefined color space to a second set of values in said output color space;
   means for creating said color separation lookup table by using both a plurality of first values from said first color separation table and using a plurality of second values from said second color separation table for each input value.

19. A digital processing system as in claim 18 further comprising means for determining a gamut definition for said color output device.

20. A digital processing system as in claim 19 further comprising means for blending at least some of said plurality of first values with at least some of said plurality of second values to provide a plurality of blended values in said color separation lookup table.

21. A method of creating a set of data values representing a color separation, said method comprising:
   creating a first color separation which determines a conversion from a first set of color values to a first set of colorant values;
   creating a second color separation which determines a conversion from the first set of color values to a second set of colorant values, wherein said second color separation is based upon redefining chromaticities of said first color separation;
   creating said color separation by using both said first set of colorant values and using said second set of colorant values.

22. A method as in claim 21 wherein said color separation lookup table contains said first and said second set of colorant values.

23. A lookup table for providing colorant values in an output color space given a corresponding color in a first color space, the lookup table comprising for each input value an output value that is generated by combining both:
   a first value derived from said first color space to colorant conversion, said first value being used to provide a colorant value for a color in the first color space which is within a gamut of an output device; and
   a second value derived from a predefined color space to colorant conversion, said predefined color space for use in gamut correction due to gamut limitations of said output device, said predefined color space derived from said first color space by redefining chromaticities of said first color space.

24. A computer readable medium containing a lookup table as in claim 23.

25. A lookup table as in claim 23 wherein said predefined color space is based upon a transformation function having said set of redefined chromaticities.

26. A lookup table as in claim 23 created by a process comprising:
   creating a first color separation table which comprises said first set of values;
   creating said predefined color space;
   creating a second color separation table for converting values of colors in said predefined color space to values in said colorant space, said second color separation table comprising said second set of values.

27. A process for printing a color image comprising:
   receiving an input color specified by input color values in a first color space;
   using said input color values to obtain values from a memory containing a data structure having a first set of values and a second set of values, said first set of values derived from said first color space to colorant conversion, said first set being used to provide a colorant value for a color in the first color space which is within a gamut of an output device and said second set of values derived from a predefined color space to colorant conversion, said predefined color space for use in gamut correction due to gamut limitations of said output device, said predefined color space being specified by a set of redefined chromaticities.

28. A process as in claim 27 wherein said predefined color space is based upon a transformation function having said set of redefined chromaticities.

29. A process as in claim 27 wherein said redefined monitor chromaticities comprises three sets of values specifying three primary colors of a CRT monitor.

\* \* \* \* \*